United States Patent [19]
Betts et al.

[11] 4,225,956
[45] Sep. 30, 1980

[54] MULTIPLEX CONFERENCE BRIDGE

[75] Inventors: William L. Betts, Maderia Beach; L. Ray Blackman, Sarasota, both of Fla.

[73] Assignee: E-Systems, Inc., Dallas, Tex.

[21] Appl. No.: 937,444

[22] Filed: Aug. 28, 1978

[51] Int. Cl.² .......................................... H04M 3/56
[52] U.S. Cl. .................................................... 370/62
[58] Field of Search ...................... 179/18 BC, 1 CN

[56] References Cited
U.S. PATENT DOCUMENTS

| | | | |
|---|---|---|---|
| 3,883,697 | 5/1975 | Brown | 179/18 BC |
| 3,937,898 | 2/1976 | Presto et al. | 179/18 BC |
| 3,984,643 | 10/1976 | Inrig et al. | 179/18 BC |
| 4,049,921 | 9/1977 | Zwack | 179/18 BC |
| 4,059,735 | 11/1977 | Betts | 179/18 BC |
| 4,109,111 | 8/1978 | Cook | 179/18 BC |
| 4,119,807 | 10/1978 | Nahay | 179/18 BC |

FOREIGN PATENT DOCUMENTS 1409610 10/1975 United Kingdom .

*Primary Examiner*—Thomas W. Brown
*Attorney, Agent, or Firm*—Robert V. Wilder; Albert M. Crowder, Jr.

[57] ABSTRACT

A conferencing circuit for use in a digitized voice, time division multiplex (TDM) loop communication system. Digitized speech samples from conferee subscriber stations are extracted from the TDM loop and summed over a frame interval. The sum is stored and the input from each subscriber station is subtracted from the sum and the remainder is placed on the TDM loop for return to the respective station. A conference control signal is generated which is synchronous with the TDM loop and the subscriber station's time slot and has a given state for each slot assigned to a subscriber station that participates in the conference. The conference control signal controls the circuitry which sums the digitized speech samples generated by the conference subscriber stations.

5 Claims, 3 Drawing Figures

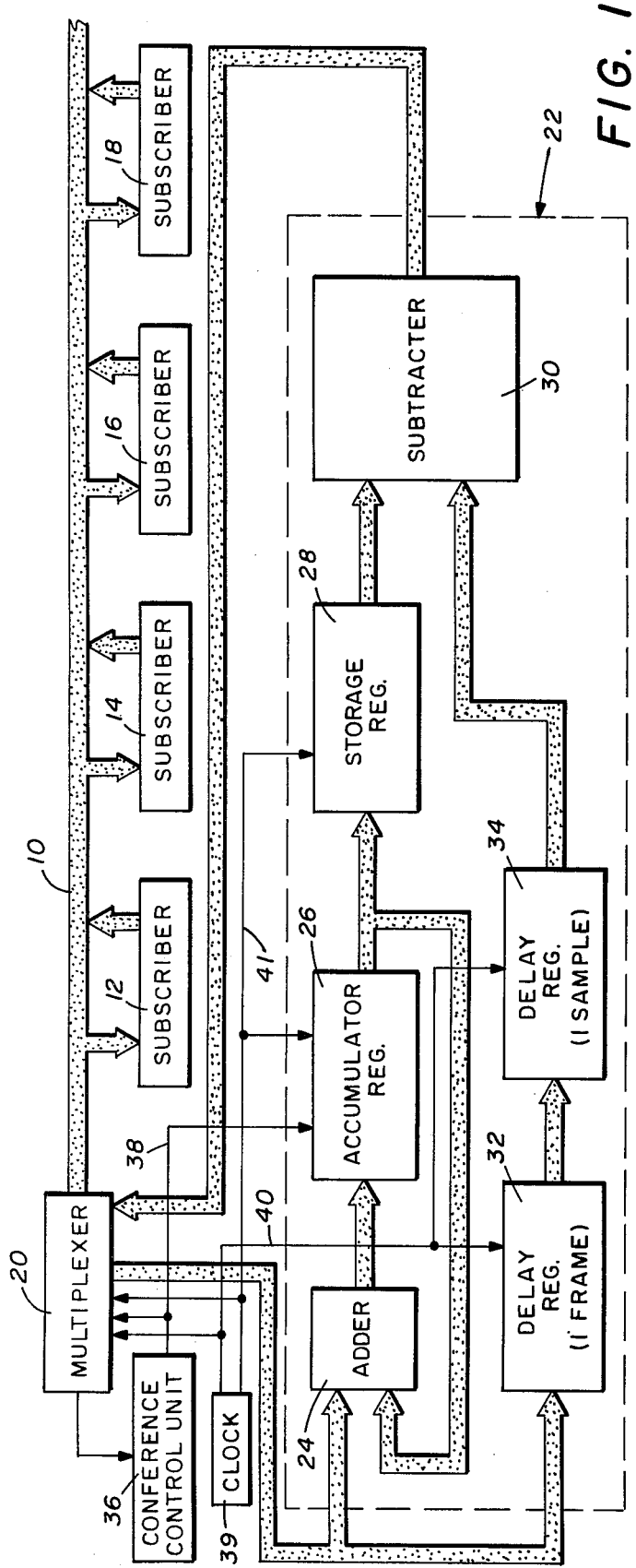
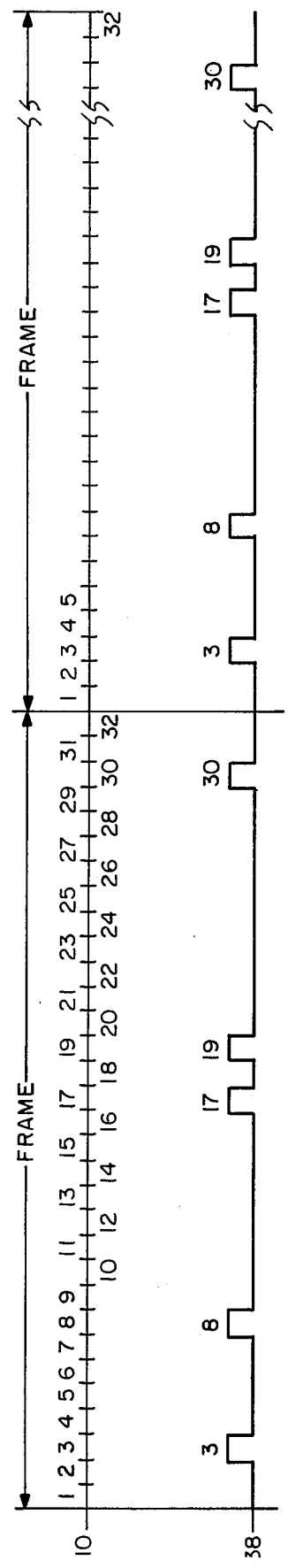
FIG. 1
FIG. 2

4,225,956

MULTIPLEX CONFERENCE BRIDGE

A related invention entitled Multiplex Conference Bridge is disclosed in copending application Ser. No. 926,635 filed July 21, 1978.

BACKGROUND OF THE INVENTION

The present invention relates to digitized speech communications systems and more particularly to a conferencing circuit for use in a time division multiplex loop communications system.

In a digitized voice, time division multiplex communications system, all of the subscriber stations are connected on a common communications path which is allocated to each subscriber station on a time division basis. Analog voice signals input at each of the subscriber stations are sampled at a constant rate and each sample is converted into an equivalent digital word. During designated time slots each subscriber station removes from the loop the digitized speech sample sent to the subscriber station while during another time slot there is placed on the loop the output speech sample from the subscriber station. The speech samples are provided to each subscriber station and returned from each subscriber station at such a rate as to make possible continuous communication between the subscriber station despite the sharing of the communications path.

A conferencing circuit in a communications system enables a plurality of subscriber stations to engage in a group conversation. Numerous circuits of this type have been developed, both for analog and digital applications. With the development of digitized voice communications using time division multiplexing, a need has arisen for a digital conferencing circuit which can group any number of subscriber stations, does not interfere with non-conference communications, and effectively suppresses side-tone interference.

A prior art digital conferencing circuit is shown in U.S. Pat. No. 3,551,600 to Berch. In this circuit, a number of telephone lines are scanned, the voltage digitized and the resulting digital words summed for all the lines. The signal returned to each subscriber station has that particular station's input removed through algebraic subtraction. Although this circuit does provide sidetone suppression, it does not include means for passing through non-conference conversations and does not provide for a digital selection of conferees.

SUMMARY OF THE INVENTION

In accordance with the present invention, there is provided a conferencing circuit for use with a time-division multiplex loop communications system in which each subscriber station is assigned a time slot within a repeating time frame and each time slot has specified portions thereof designated to transfer a digital speech input sample and output sample. The conferencing circuit includes a repeating, binary, conferee selector signal which is synchronous with the time division multiplex loop and has a given state in coincidence with a subscriber station time slot to include that particular subscriber station within the conference call. A summation circuit is provided for generating a summation of all subscriber outputs transmitted during each frame and the summation thus produced is stored at the end of the time frame. During the following time frame, the stored summation is sent to each subscriber station in the conference minus that station's input previously used in the summation.

BRIEF DESCRIPTION OF THE DRAWINGS

For a more complete understanding of the present invention and the advantages thereof, reference is now made to the following description taken in conjunction with the accompanying drawings in which:

FIG. 1 is a block diagram of a conferencing circuit in accordance with the present invention, FIG. 2 is a timing diagram illustrating signals present in the block diagram shown in FIG. 1.

DETAILED DESCRIPTION OF THE INVENTION

Figure 3:
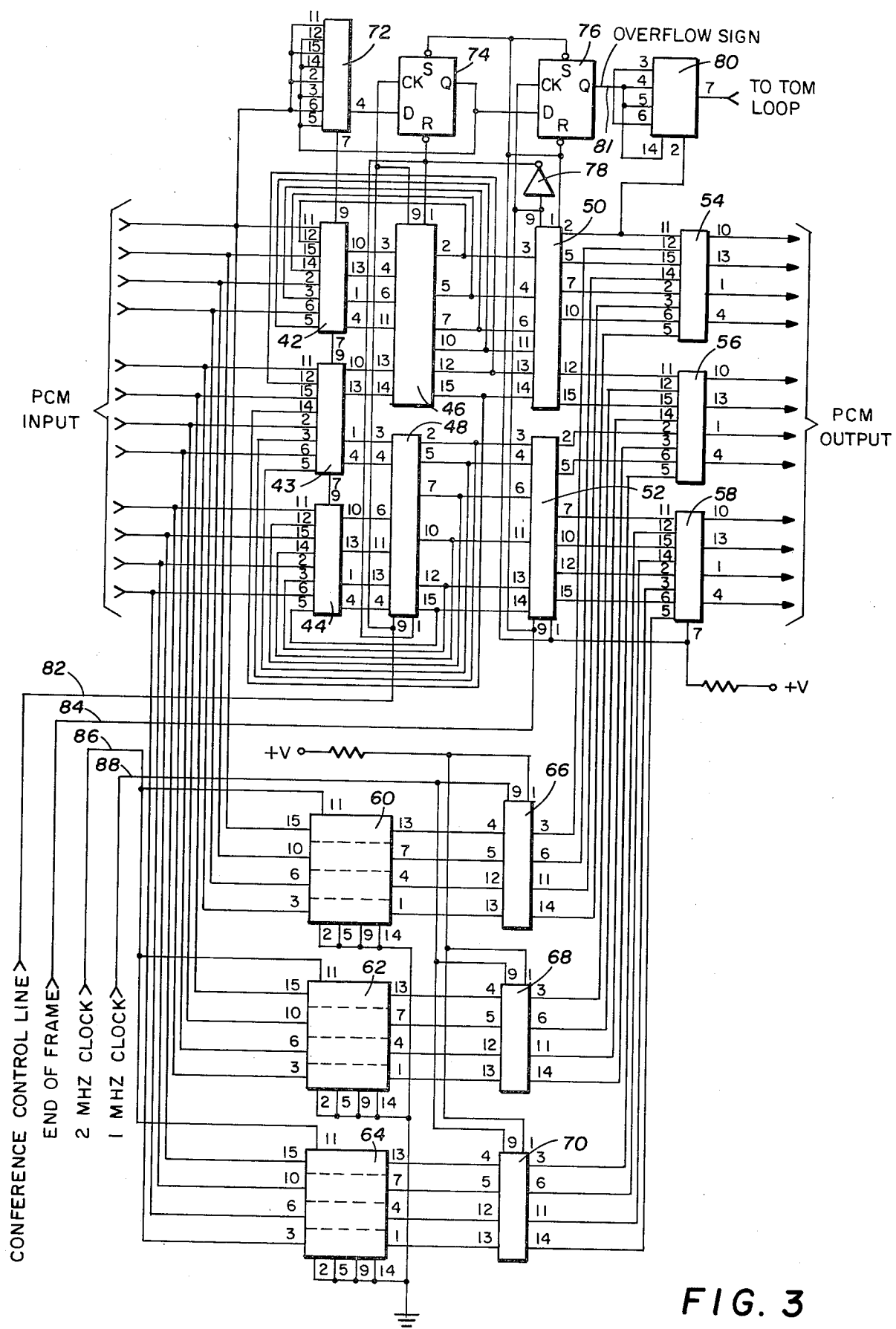
FIG. 3 is a schematic diagram of a conferencing circuit in accordance with the present invention.

A time division multiplex communication loop and a conferencing circuit in accordance with the present invention are illustrated in block diagram form in FIG. 1. A time division multiplex (TDM) loop 10 is the common pathway for interconnecting subscriber stations 12, 14, 16, and 18. It is possible to have many additional subscriber stations on the TDM loop 10 with the primary limitation on the number of stations being the data rate of the loop. In this embodiment each digital speech sample is a 12 bit word with the 12 bits being shifted in parallel fashion over the loop.

A multiplexer 20 reads the output words from each of the subscriber stations and provides the input words to each of the subscriber stations. Multiplexer 20 routes voice samples to and from the subscriber stations. The multiplexer 20 comprises a plurality of pairs of transmit and receive multiplexer integrated circuits. The transmit circuit is a Texas Instruments model 54154 and the receive circuit is a Texas Instruments model 54150. The number of circuit pairs required is a function of the number of stations and the number of bits comprising the digitized speech samples.

A multiplex conferencing unit in accordance with the present invention is shown within the dotted outline 22. The digitized output speech samples from each of the subscriber stations are shifted through the multiplexer 20 in parallel to an adder 24. The output of the adder is supplied to an accumulator register 26 which is connected to provide a summation to a second input to the adder 24 and to a storage register 28. The storage register 28 periodically shifts the summation to a first input to a subtracter 30.

The output signals of the subscriber stations transferred through the multiplexer 20 are also provided to a delay register (one frame) 32 and from it to a delay register (one sample) 34. From the delay register 34 the parallel-shifted signal is supplied to a second input of the subtracter 30. The difference signal from the subtracter 30 is provided to the multiplexer 20 which places the signal on the time division multiplex loop 10 for transfer to the subscriber stations.

A conference control unit 36 monitors a status word generated by each of the subscriber stations. Included within the status word is a control bit to indicate that the subscriber is requesting that a conference call be established. Upon receipt of a plurality of conference requests, the conference control unit 36 generates a conference control signal on conference control line 38. This control signal is provided to the multiplexer 20 and the accumulator register 26. Conference control unit 36 comprises a microprocessor model 8080 manufactured by Intel Corp.

A clock 39 generates timing signals to synchronize operation of the various circuits. A basic clock signal is provided over line 40 to the multiplexer 20 and the delay registers 32 and 34. An end-of-frame clock signal is provided over line 41 to the multiplexer 20 and the storage register 28.

In order to algebraically add and subtract the speech samples, the samples must be encoded in a linear pulse code modulation (PCM) format. However, speech samples may be carried over the time division multiplex loop 10 in a non-linear code if transformation circuitry is provided between the time division multiplex loop 10 and the adder 24 and delay register 32, and also between the subtracter 30 and multiplexer 20. This circuitry, which is commercially available, transforms non-linear code to linear code for input to the conference unit and at the output of the conference unit converts the coded sample from linear back to non-linear format. Similarly, transformation circuitry could be inserted so that data is carried on the TDM loop 10 using continuous variable slope delta modulation.

Operation of the multiplex conference bridge is described with reference to FIGS. 1 and 2. FIG. 2 is a timing diagram that illustrates the operation of the TDM loop 10 and also illustrates a sample waveform on the conference control line 38. The TDM loop 10 operates in a repeating frame mode which is subdivided, in this embodiment, into 32 time slots. Each of the subscriber stations 12, 14, 16, 18, and so forth, is assigned to one of the 32 time slots. Therefore, during each frame interval each subscribe station has access to the TDM loop for one time slot. For this embodiment, each time slot has a duration of one microsecond, which produces a frame that is 32 microseconds long at a rate of 31,250 frames per second. Each time slot within the frame is further divided into two sample periods, a transmit and a receive portion. During the first half of the time slot, a subscriber station provides an output signal to the TDM loop 10 and during the second half of the time slot, the subscriber station receives a voice sample from the TDM loop 10.

A waveform example of the conference control signal on line 38 is illustrated in FIG. 2. This waveform illustrates the condition in which the subscriber stations assigned to time slots 3, 8, 17, 19, and 30 are connected in a conference call. The conference control signal is synchronous with the frame and time slots of the TDM loop 10, and it is repeated for each frame for as long as the conference call exists. In this embodiment, as many as 32 stations may be engaged in a single conference, but, only one conference call may take place at any given time. While a conference is in progress, non-conferee stations can continue to make calls as usual over the time division multiplex loop 10.

The first voice sample input to the adder 24 comprises the output signal from the subscriber station assigned to time slot No. 1. Output signals from each of the remaining time slots are sequentially supplied to the adder 24. The second input to the adder 24 is the output of the accumulator register 26. The accumulator register 26 accepts the output of the adder 24 only when it is activated by the conference control signal provided over line 38. Therefore, during one frame interval the output signals from the subscriber stations engaged in the conference, slots 3, 8, 17, 19 and 30 in this example, and only those stations, are included in the summation. The summation is stored during the summation process in the accumulator register 26.

At the end of each frame interval, the storage register 28, in response to the end-of-frame signal generated by clock 39, transfers the sum in accumulator register 26 to the storage register 28. The end-of-frame signal also clears the accumulator register 26. This summation is provided by the storage register 28 to a first input of the subtracter 30 during the succeeding frame interval.

The output from each of the subscriber stations is also provided to a delay register 32 which is 12 bits wide and 32 stages long. Thus, the delay register 32 provides a time delay equal to the duration of one frame. Next, the output of each subscriber station is applied to the delay register 34. The delay register 34 is also 12 bits wide, however, it provides a delay of only one sample period which is one-half of a time slot or one-half of a microsecond. Thus, the total delay is 32.5 microseconds for this particular embodiment.

The output from each of the subscriber stations is sequentially subtracted from the summation in the subtracter 30 and the difference is provided to the multiplexer 20 and thence to the TDM loop 10 during the second half of the time slot which is the half during which the individual subscriber station receives a speech sample. A subtraction process is carried out by the subtracter 30 for each of the time slots in the frame. The result is that the input signal provided by each subscriber station is removed from that station's receive signal. In response to the conference control signal on line 38 the multiplexer 20 blocks the data received from subtracter 30 for each time slot assigned to a subscriber station not involved in a conference call. Therefore only stations involved in the conference call receive the conference data.

This subtraction process minimizes side-tone interference, which is a ringing noise created when a subscriber hears his own output signal. If not minimized, side-tone interference can become so serious as to disrupt the conference call. Thus, the subtraction process substantially reduces the side-tone interference problem.

A schematic diagram of a multiplex conferencing circuit in accordance with the present invention is shown in FIG. 3. Digital speech sample inputs in 12 bit pulse code modulation format are extracted from the TDM loop (not shown in this FIGURE) and provided to adder circuits 42, 43, and 44. The output sum of the circuits 42, 43, and 44 is transferred to the registers 46 and 48. The output of these registers is provided as the second input to the adder circuits 42, 43, and 44 and to storage registers 50 and 52. The summation stored in registers 50 and 52 is transferred following each frame to a first input to the subtraction circuits 54, 56, and 58.

The PCM input from the TDM loop is also provided to a set of registers 60, 62, and 64. These registers provide a one frame interval time delay. The output of these registers is provided to a second group of registers 66, 68, and 70. These registers provide the 12 bit PCM signal with a one-half slot or 0.5 microsecond delay. After this delay the PCM signal is provided to a second input to the subtraction circuits 54, 56, and 58. The delayed digital signal is subtracted from the summation provided to the first input of the subtraction circuits 54, 56 and 58 and the difference is provided as a 12 bit PCM signal which is returned to the TDM loop for delivery as the received signal to the stations in the conference call.

The circuits 72, 74, 76, and 78 provide overflow control means should the summation for the conference call exceed the storage capacity of the registers. If several stations were to provide inputs at the same time, the summation amplitude could exceed the storage capacity of the registers and would create not only an erroneous amplitude quantity but would generate an incorrect sign bit in the PCM word. The overflow circuits provide a means for maintaining the correct sign of the summation quantity despite overflow of the register. A comparison of the sign bit in the PCM word with the sign bit output by the overflow circuit provides an indication that overflow has occurred. The overflow sign is carried on line 81.

The integrated circuits for the circuit elements shown in the embodiment in FIG. 3 are given in the following table.

| CIRCUIT ELEMENT | MANUFACTURER | PART NUMBER |
| --- | --- | --- |
| 40, 42, 44, 54, 56, 58 | Texas Instruments | Model 74283 |
| 46, 48, 50, 52 | Texas Instruments | Model 74174 |
| 60, 62, 64 | Texas Instruments | Model TMS 3417 |
| 66, 68, 70 | Texas Instruments | Model 74175 |
| 74, 76 | Texas Instruments | Model 7474 |
| 78 | Texas Instruments | Model 7404 |
| 80 | Texas Instruments | Model 74153 |

Pin terminal connections for the various integrated circuits are shown in FIG. 3.

The conference control signal described above is provided on the conference control line 82 which is connected to the accumulator registers 46 and 48.

An end of frame synchronization signal is provided on line 84 to the storage registers 50 and 52 and to circuit 76. In addition, a 2 MHz clock signal is provided on line 86 and a 1 MHz clock signal is provided on line 88.

Although the invention has been illustrated in the accompanying drawings and described in the foregoing detailed description, it will be understood that the invention is not limited to the embodiment disclosed, but is capable of numerous rearrangements, modifications, and substitutions without departing from the scope of the invention.

What is claimed is:

1. Apparatus for establishing a conference call between a plurality of subscriber stations on a time division multiplex loop wherein each subscriber station is assigned a time slot within a frame for transmitting and receiving digitized speech samples, comprising:
   (a) means for generating a control signal synchronous with said frame and having a first state in time coincidence with each time slot which is assigned to a subscriber station in the conference call and a second state in time coincidence with each time slot which is assigned to a subscriber station not included in the conference call,
   (b) an accumulating register for accumulating therein a sum of digitized speech samples generated by the conference subscriber stations, said accumulating register operating responsively to said control signal to receive inputs and transfer the contents thereof as an output,
   (c) means for adding digitized speech samples received from said conference subscriber stations through said multiplex loop to the output from said accumulating register and for transferring the output of said means for adding to said accumulating register,
   (d) a storage register having the input thereof connected to receive said sum from said accumulating register at the end of each frame,
   (e) delay means connected to said multiplex loop for delaying for approximately one frame period the digitized speech samples generated by said subscriber stations,
   (f) subtracting means connected to receive said sum from said storage register and the output of said delay means for sequentially subtracting each of the delayed digitized speech samples from the sum received from said storage means to produce a series of partial sums, and
   (g) means for transferring said partial sums in synchronism with said control signal from said subtracting means through said multiplex loop to said conference subscriber stations, each conference subscriber station receiving the partial sum comprising the summation of the digitized speech samples generated over one frame by the remaining subscriber stations in the conference call.

2. The apparatus recited in claim 1 including means responsive to said control signal for inhibiting the transfer of said partial sums from said subtracting means to said multiplex loop during the periods of time slots assigned to subscriber stations not included in said conference call.

3. A method for establishing a conference call between a plurality of subscriber stations on a time division multiplex loop wherein each subscriber station is assigned a time slot within a frame for transmitting and receiving digitized speech samples, comprising the steps of:
   (a) generating a control signal which is synchronous with said frame and has a first state in time coincidence with each time slot which is assigned to a subscriber station in the conference call and a second state in time coincidence with each time slot which is assigned to a subscriber station not included in the conference call,
   (b) accumulating in an accumulating register a sum of the digitized speech samples generated by the conference subscriber stations over one frame, said accumulating register receiving inputs and transferring the sum as an output in response to said control signal,
   (c) adding in an adding means the digitized speech samples received from said conference subscriber stations through said multiplex loop to the output from said accumulating register and transferring the output of the adding means to said accumulating register,
   (d) storing in a storage register at the end of each frame the sum accumulated in said accumulating register over one frame,
   (e) delaying for approximately the period of one frame the digitized speech samples received through said multiplex loop from said conference subscriber stations, (f) sequentially subtracting in a subtracting means each of the delayed digitized speech samples from the sum stored in said storage means to produce a series of partial sums, and (g) transferring said partial sums in synchronism with said control signal through said multiplex loop to said conference subscriber stations, each subscriber station receiving the partial sum comprising the summation of the digitized speech samples generated over one frame by the remaining subscriber stations in the conference call.

4. The method recited in claim 3 including the step of inhibiting the transfer of said partial sums from said subtracting means to said multiplex loop during the periods of time slots assigned to subscriber stations not included in said conference call.

5. The method recited in claim 3 wherein said subscriber stations transmit speech samples to the multiplex loop during one half of the time period of the time slot assigned to the respective subscriber stations and receive speech samples from the multiplex loop during the remaining one half of the period of the time slot assigned to the respective subscriber stations.

* * * * *